United States Patent Office 3,230,274
Patented Jan. 18, 1966

3,230,274
PREPARATION OF LINEAR POLYPEPTIDES
John D. Garber and Frederick M. Meigs, Westfield, N.J., assignors to Merck & Co., Inc., Rahway, N.J., a corporation of New Jersey
No Drawing. Filed Dec. 30, 1960, Ser. No. 79,552
7 Claims. (Cl. 260—857)

This invention relates to linear polypeptide compositions and relates particularly to compositions comprising linear polypeptides which consist of repeating monomeric units of hydrocarbonyl glutamates and processes for producing the same.

Linear polymers consisting of repeating monomers of hydrocarbonyl glutamates have been prepared prior to this invention by various methods. The polymerization of an α-amino acid N-carbonic anhydride, initiated by either alkali metal alkoxides or organic amines is considered to be the most convenient route to high-molecular-weight polypeptides.

It is preferable for the polymerization to be carried out in the presence of a relatively small quantity of low-molecular-weight polymer which has the same structure as that polymer desired. Thus, a γ-hydrocarbonyl-L-glutamate-N-carboxyanhydride may be polymerized in the presence of a small quantity of polymer consisting of repeating monomer units of γ-hydrocarbonyl-L-glutamate, and a γ-hydrocarbonyl-D-glutamate-N-carboxyanhydride may be polymerized in the presence of a small quantity of polymer consisting of repeating monomer units of γ-hydro-carbonyl-D-glutamate.

It was found, for example, that γ-benzyl-L-glutamate-N-carboxylic anhydride could be polymerized in a dioxane solvent at 25° C., when an n-hexylamine catalyst is used to initiate the reaction. A linear polymer is relatively slowly produced, consisting of repeating monomers of γ-benzyl-L-glutamate. In general, the γ-alkyl-L-glutamate-N-carboxylic anhydrides must be prepared from L-glutamic acid. L-glutamic acid is prepared either (i) by fermentation methods or (ii) by synthetic methods. When glutamic acid is produced synthetically, the optically inactive form is produced, DL-glutamic acid. DL-glutamic acid must undergo a costly resolution process for separating L-glutamic acid from D-glutamic acid.

γ-Alkyl-DL-glutamate-N-carboxylic anhydrides also may be polymerized in the presence of an organic amine or alkali metal alkoxide initiator to produce a linear copolymer consisting of monomer units, distributed randomly in the chain, of γ-alkyl-L-glutamate and of γ-alkyl-D-glutamate. It is noteworthy that commercial fibers can be produced only from either linear polymers consisting of repeating monomer units of γ-alkyl-L-glutamate or linear polymers consisting of repeating monomers of γ-alkyl-D-glutamate. Fibers produced from polymerization of γ-alkyl-DL-glutamic-N-carboxy anhydride when polymerization takes place in the presence of a polymer consisting of a random distribution of γ-alkyl-L-glutamate monomer units and γ-alkyl-D-glutamate monomer units and/or in the presence of an organic amine or diamine have not been found to be useful in a commercial sense.

When polymerization of γ-alkyl-DL-glutamic acid-N-carboxy anhydride is carried out in the presence of an organic amine and a relatively small quantity of polymer which consists of repeating monomer units of γ-alkyl-D-glutamate, the resulting product is a mixture of polymers which consists of (i) a relatively small quantitiy of a polymer containing predominantely monomer units of γ-alkyl-D-glutamate and (ii) a relatively large quantity of polymer containing mixed monomer units of γ-alkyl-L-glutamate and γ-alkyl-D-glutamate. Similar results are obtained if γ-alkyl-L-glutamate polymers are added initially, except that a small quantity of polymer containing predominately L-glutamate is obtained together with the D-, L-copolymer. The above products are not suitable as fiber-forming materials because of their heterogeneity along the polypeptide backbone.

It is therefore an object of this invention to provide a polymer composition derived from DL-glutamic acid, which composition can be drawn into fibers having a relatively high tensile strength.

Another object of this invention is to provide a commercial process for the production of a polymer composition derived from DL-glutamic acid, which composition can be drawn into fibers having a relatively high tensile strength.

Still another object of this invention is to provide a low-cost process for the polymerization of γ-hydrocarbonyl-DL-glutamate-N-carboxy anhydride, wherein the entire quantity of reactant is polymerized.

Further objects will be apparent from the detailed disclosure provided herein:

In accordance with our invention, we have found that a γ-hydrocarbonyl-DL-glutamate-N-carboxy anhydride may be totally converted into a composition containing polymers consisting of repeating monomers of γ-hydrocarbonyl-L-glutamate and polymers consisting of repeating monomers of γ-hydrocarbonyl-D-glutamate. In addition, it has been found that a composition consisting of these polymers may be drawn into fibers which have a relatively high tensile strength.

The compositions of our invention may be prepared by contacting a γ-hydrocarbonyl-DL-glutamate-N-carboxy anhydride with (1) a polymer consisting of repeating monomer units of a γ-hydrocarbonyl-D-glutamate, and (2) a polymer consisting of repeating monomer units of a γ-hydrocarbonyl-L-glutamate. An organic amine or alkali metal alkoxide initiator may also be included in the reaction mixture.

The reaction is as follows:

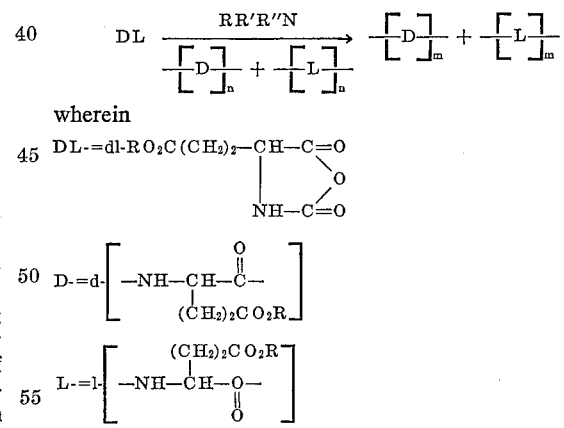

wherein $$DL\text{-}=dl\text{-}RO_2C(CH_2)_2-CH-C=O$$
$$| \quad \quad \quad \setminus O$$
$$NH-C=O \quad /$$

$$D\text{-}=d\text{-}\left[-NH-CH-\overset{O}{\underset{\|}{C}}-\\ \quad (CH_2)_2CO_2R\right]$$

$$L\text{-}=l\text{-}\left[-NH-CH-O-\\ \quad (CH_2)_2CO_2R \quad \|\\ \quad \quad \quad \quad O\right]$$

R=alkyl, aryl, alkenyl or alkynyl
R′, R″=H or alkyl
n=an integer of 5–25
m=an integer of 100–1000

It is preferable that prior to the reaction, γ-hydrocarbonyl-DL-glutamate-N-carboxy anhydride be dissolved in a solvent such as methylene chloride, dioxane, ethylene dichloride, or mixtures of varying proportions of methylene chloride and dioxane. The concentration of the γ-hydrocarbonyl-DL-glutamate-N-carboxy anhydride should be between 2% and 30% by weight of the solution.

The temperature at which the reaction takes place may vary between the freezing point of the solution used and 100° C. At reaction temperatures in the range of 50° C. and 100° C. the reaction may be run at pressures up to three atmospheres, so that the solvent used will be prevented from evaporating.

The polymerization reaction is influenced by the concentration of monomer, type and concentration of solvent and initiator, temperature, and the like. In order to maximize the formation of -D-D-D-+-L-L-L-products and minimize the formation of -D-L-D-L-types it is important to keep the initiator concentration at the lowest possible levels consistent with a reasonable reaction time. Alternately, no initiator (organic amine or inorganic metal alkoxide) is added, and polymerization is effected by the addition of preformed -D-D-D- and -L-L-L-polymer only.

We have found that the ratio of -D-D-D-polymer to -L-L-L-polymer in the catalyst mixture may vary from about 1:4 up to 4:1. This ratio is preferably 1:1 when racemic γ-hydrocarbonyl glutamate-N-carboxyanhydride (a mixture containing 50% γ-hydrocarbonyl-D-glutamate and 50% γ-hydrocarbonyl-L-glutamate) is used as a starting material. When partially resolved γ-hydrocarbonyl glutamate-N-carboxy-anhydride is used as a starting material, the ratio of -D-D-D-polymer to -L-L-L-polymer in the catalyst mixture is preferably approximately the same as the ratio of γ-hydrocarbonyl-D-glutamate-N-carboxy anhydride to γ-hydrocarbonyl-L-glutamate-N-carboxy anhydride in the partially resolved mixture. The relationship for our invention may be expressed as follows:

$$R = \frac{\text{Ratio of -D-D-D-polymer:-L-L-L-polymer in catalyst}}{\text{Ratio of -D-monomer:-L-monomer}}$$

$$R = \frac{\text{From 1:4 up to 4:1}}{\text{From 1:4 up to 4:1}}, \text{ but preferably} = 1 \ (4 \geq R \geq 1/4)$$

For example, when the starting material is a totally racemic mixture of γ-hydrocarbonyl-DL-glutamate, the fiber strength of the resultant polymer is greater than a polymer produced using partially resolved γ-hydrocarbonyl-glutamate containing 65% γ-hydrocarbonyl-D-glutamate and 35% γ-hydrocarbonyl-L-glutamate and the ratio of -D-D-D-polymer to -L-L-L-polymer in the catalyst in both cases is 1. However, even when the aforementioned ratio, R, is as high as 4:1, the resultant polymeric mixture has properties far superior to polymers containing randomly distributed monomeric units of γ-hydrocarbonyl-L-glutamate and of γ-hydrocarbonyl-D-glutamate.

The polymeric mixtures produced by our invention may again be used as catalysts for producing more polymers from racemized or partially racemized γ-hydrocarbonyl-glutamates.

Among the organic amines which may be used in the catalyst composition are methyl amine, dimethyl amine, tripropyl amine, tributyl amine, pyridine, cyclohexyl amine, piperidine, aniline, and butyl aniline.

The ester group of the γ-hydrocarbonyl-DL-glutamate-N-carboxyanhydride may be alkyl, such as methyl, ethyl, propyl, butyl, pentyl, octyl, decyl, and stearyl; alkenyl, such as allyl, 3-methyl-1-pentenyl, 2-methyl-1-butenyl, and methallyl; alkenyl, such as propanyl, 3-butynyl and 5-methyl-1-pentynyl; and aryl, such as phenyl, o-tolyl, p-tolyl, benzyl, 2-ethyl benzyl, 3-propyl benzyl, β-[α-methyl naphthyl]-α-naphthyl and β-naphthyl.

After the initiating the reaction, the reaction mass is allowed to remain in solution for the desired period of time at a given temperature depending on the molecular weight of polymer required. The resulting resin syrup may then be extruded into a precipitating bath containing an inert solvent such as acetone. Alternatively, the resulting resin syrup may be cast as a sheet or dried by extrusion into a hot vapor stream.

The resin compositions of this invention are useful in the manufacture of synthetic fibers and self-supporting films.

The following examples are given for the purpose of illustration and not by way of limitation.

EXAMPLE 1

100 grams of γ-methyl-DL-glutamate-N-carboxy anhydride is added to 900 grams of a solvent mixture containing 720 grams of methylene chloride and 180 grams of dioxane. The resulting solution is divided into two equal parts: Solution A and Solution B.

(a) Solution A 2.5 grams of poly(γ-methyl-D-glutamate) and 2.5 grams of poly(γ-methyl-L-glutamate) are added to Solution A. Each of the two polymers has a molecular weight of 1100 and a degree of polymerization of about 8. To the resulting solution 0.83 gram of tributyl amine are added. Polymerization is initiated promptly. The reaction mass is allowed to stand for a period of 24 hours at a temperature of 25° C. The resulting viscous polymer solution is then extruded into an acetone precipitating bath containing 1000 ml. of acetone. The resultant fiber is then passed through a water bath maintained at 25° C. It is then stretched to 170% of its original length prior to drying. Tough, strong fibers are obtained that are insoluble in ethanol, diethyl ether, carbon tetrachloride, methanol, o-dichlorobenzene, and o-chlorotoluene. A monofilament of the above fiber shows a tensile strength (knotted) of 1.2 grams per denier.

(b) Solution B 0.75 gram of tributyl amine is added to Solution B. Polymerization is initiated promptly. The reaction mass is allowed to stand for a period of 24 hours at a temperature of 25° C. The resulting viscous polymer solution is then extruded into an acetone precipitating bath, containing 1000 ml. of acetone. Weak, brittle specimens are obtained from the precipitated polymers. These specimens cannot be cold drawn satisfactorily and showed tensile strength (knotted) of less than 0.2 gram per denier.

The product obtained from Solution A is a mixture consisting of equal parts of predominately poly(γ-methyl-D-glutamate) and poly(γ-methyl-L-glutamate). The product obtained from Solution B is a random copolymer consisting of a monomer unit of γ-methyl-L-glutamate and γ-methyl-D-glutamate.

EXAMPLE 2

An experiment is carried out using a procedure similar to that of Example 1 with the exception that no tributyl amine is added to either Solution A or Solution B and a random copolymer of D- and L-γ-methyl glutamate monomer units is added to Solution B. 5.0 grams of poly(γ-methyl-L-glutamate) and 5.0 grams of poly(γ-methyl-D-glutamate) are added to Solution A. 10 grams of a random coplymer consisting of monomer units of γ-methyl-L-glutamate and γ-methyl-D-glutamate are added to Solution B.

The product recovered from Solution A, following the procedure of Example 1, is a tough, strong fiber insoluble in ethanol, diethyl ether, carbon tetrachloride, methanol, o-dichlorobenzene, and o-chlorotoluene. When a monofilament of the fiber is stretched 70%, a tensile strength (knotted) of 1.35 grams per denier is shown.

The product recovered from Solution B cannot be cold drawn satisfactorily, and showed a tensile strength when knotted of less than 0.20 gram per denier.

EXAMPLE 3

100 grams of γ-ethyl-DL-glutamate-N-carboxy anhydride are added to a solvent mixture containing 1100 grams of methylene chloride and 210 grams of dioxane. To the resulting solution 5 grams of poly(γ-ethyl-D-glutamate), molecular weight 1100, and 5 grams of poly(γ-ethyl-L-glutamate), molecular weight 1100, are added.

Following this addition, 1 gram of tributyl amine is added to the solution. Polymerization is initiated promptly. The reaction mass is allowed to stand for a period of 3 hours at a temperature of 25° C. The resulting viscous reaction mass is poured into a shallow tray, ¼" in depth. The polymer is isolated as a flexible sheet. When the polymer is drawn into a fiber by the procedure used in Example 1, and the monofilament is stretched 100%, a tensile strength (knotted) of 1.4 grams per denier is shown.

EXAMPLE 4

Partially resolved glutamic acid is produced in the following manner.

A saturated aqueous solution containing 510 grams of racemic DL-glutamic acid monohydrochloride is seeded with 10 grams of L-glutamic acid. 85 grams of 75% L-glutamic acid precipitate. The precipitate contains 75.5% L-glutamic acid and 24.5% D-glutamic acid. The mother liquors contain 57% D-glutamic acid and 43% L-glutamic acid. This procedure is given in detail in U.S. Patent 2,940,998, issued June 14, 1960.

The mother liquors are evaporated to dryness and 100 grams of the residue is added to 900 grams of a solvent mixture containing 800 grams of methylene chloride and 100 grams of dioxane. 6.0 grams of poly(γ-methyl-L-glutamate) and 4.0 grams of poly(γ-methyl-D-gultamate) are added to the solution. Each of the two polymers has a molecular weight of 1100 and a degree of polymerization of 8. To the resulting solution, 0.50 gram of tributyl amine is added. Polymerization is initiated promptly. The reaction mass is allowed to stand for a period of 24 hours at a temperature of 30° C. The resulting viscous polymer solution is then extruded into an acetone precipitating bath containing 2000 ml. of acetone. The resulting fiber is then passed through a water bath maintained at 25° C. It is then stretched to 170% of its original length prior to drying. Tough, strong, fiber are obtained that are insoluble in ethanol, diethyl ether, carbon tetrachloride, methanol, o-dichlorobenzene and o-chlorotoluene. A monofilament of the above fiber shows a tensile strength (knotted) of 1.0 gram per denier.

Any departure from the above description which conforms to the present invention is intended to be included within the scope of the claims.

What is claimed is:

1. In the process for the polymerization of a mixture of optically active forms of the N-carboxy anhydride of a glutamate, said mixture comprising X percent of the dextrorotatory form of said glutamate and (100−X) percent of the levorotatory form of said glutamate wherein X is an integer from 20 up to 80, the improvement which comprises catalyzing said polymerization with a adequate quantity of a composition comprising a polymer consisting of repeating monomer units of the levorotatory form of said glutamate and a polymer consisting of repeating monomer units of the dextrorotatory form of said glutamate, said composition having a ratio of dextrorotatory polymer to levorotatory polymer of from 1:4 to 4:1.

2. A process for producing a mixture of synthetic substantially linear polymers, said mixture consisting of X percent by weight of a polymer which consists of repeating monomer units of D-γ-loweralkyl glutamate and (100−X) percent by weight of a polymer which consists of repeating monomer units of L-γ-loweralkyl glutamate, where X is an integer from 20 up to 80, which process comprises the steps of forming a solution comprising the compound γ-loweralkyl-DL-glutamate-N-carboxy anhydride and a solvent, adding to said solution from about 1% up to about 10% by weight of said compound of a polymer which consists of repeating monomers of D-γ-loweralkyl glutamate, from about 1% up to about 10% by weight of said compound of a polymer which consists of repeating monomers of L-γ-loweralkyl glutamate, allowing said solution to polymerize and separating said mixture of polymers from said solution.

3. A process for producing a mixture of synthetic substantially linear polymers, said mixture consisting of 50% by weight of a polymer which consists of repeating monomers of D-γ-loweralkyl glutamate and 50% by weight of a polymer which consists of repeating monomers of L-γ-loweralkyl glutamate, which process comprises the steps of forming a solution comprising about 10% by weight of the compound γ-loweralkyl-DL-glutamate-N-carboxy anhydride and a solvent, adding to said solution about 5% by weight of said compound of a polymer which consists of repeating monomers of D-γ-loweralkyl glutamate, about 5% by weight of said compound of a polymer which consists of repeating monomers of L-γ-loweralkyl glutamate and about 1.5% by weight of said γ-loweralkyl-DL-glutamate N-carboxy anhydride of a compound selected from the group consisting of hydrocarbonyl amines, allowing said solution to polymerize and separating said mixture of polymers from said solution.

4. A process for producing a mixture of synthetic substantially linear polymers, said mixture consisting of 50% by weight of a polymer which consists of repeating monomers of D-γ-methyl glutamate and 50% by weight of a polymer which consists of repeating monomers of L-γ-methyl glutamate which process comprises the steps of forming a solution comprising about 10% by weight of the compound γ-methyl-DL-glutamate-N-carboxy anhydride and a solvent comprising methylene chloride and dioxane, adding to said solution about 5% by weight of said compound of a polymer which consists of repeating monomers of D-γ-methyl glutamate and about 5% by weight of said compound of a polymer which consists of repeating monomers of L-γ-methyl glutamate and about 1.5% by weight of said γ-methyl-DL-glutamate N-carboxy anhydride of tributyl amine, allowing said solution to polymerize and separating said mixture of polymers from said solution.

5. The process according to claim 2 wherein the γ-lower alkyl-DL-glutamate N-carboxy anhydride is γ-methyl-DL-glutamate N-carboxy anhydride, the γ-loweralkyl-D-glutamate is γ-methyl and the γ-loweralkyl-L-glutamate is γ-methyl-L-glutamate.

6. The process according to claim 1 wherein the glutamate is γ-lower alkyl glutamate.

7. The process according to claim 2 wherein the polymerization is carried out additonally in the presence of a hydrocarbonyl amine.

References Cited by the Examiner

UNITED STATES PATENTS 3,089,749   5/1963   Ballard _____ 260—78

OTHER REFERENCES

Bamford et al.: "Synthetic Polypeptides," Academic Press Inc., New York, 1956, pages 62–73 and 316–317 relied upon.

LEON J. BERCOVITZ, *Primary Examiner.*

D. ARNOLD, *Examiner.*